US012104402B1

(12) United States Patent
Mazur

(10) Patent No.: US 12,104,402 B1
(45) Date of Patent: Oct. 1, 2024

(54) STRIKE ASSEMBLY

(71) Applicant: PGT Innovations, Inc., North Venice, FL (US)

(72) Inventor: Richard Mazur, Mesa, AZ (US)

(73) Assignee: PGT Innovations, LLC, Harrisburg, PA (US)

( * ) Notice: Subject to any disclaimer, the term of this patent is extended or adjusted under 35 U.S.C. 154(b) by 275 days.

(21) Appl. No.: 16/751,091

(22) Filed: Jan. 23, 2020

Related U.S. Application Data

(60) Provisional application No. 62/798,804, filed on Jan. 30, 2019.

(51) Int. Cl.
*E05B 15/02* (2006.01)

(52) U.S. Cl.
CPC ........ *E05B 15/024* (2013.01); *E05B 15/0205* (2013.01); *E05B 15/022* (2013.01); *Y10T 292/68* (2015.04); *Y10T 292/705* (2015.04); *Y10T 292/707* (2015.04)

(58) Field of Classification Search
CPC .. E05B 15/024; E05B 15/022; E05B 15/0255; E05B 15/0205; Y10T 292/705; Y10T 292/707; Y10T 292/68; Y10T 292/696
See application file for complete search history.

(56) References Cited

U.S. PATENT DOCUMENTS

| | | | | | |
|---|---|---|---|---|---|
| 572,859 | A * | 12/1896 | Bower | E05B 15/0245 | 292/341.19 |
| 633,918 | A * | 9/1899 | Smith | E05B 15/0245 | 292/341.19 |
| 749,818 | A * | 1/1904 | Hamel | E05B 15/0245 | 292/341.19 |
| 872,053 | A * | 11/1907 | Christy | E05B 15/0245 | 292/341.18 |
| 885,320 | A * | 4/1908 | Christy | E05B 15/0245 | 292/341.19 |
| 1,059,530 | A * | 4/1913 | Dupuis | E05B 15/0245 | 292/341.19 |
| 1,083,529 | A * | 1/1914 | Fletcher | E05B 15/0205 | 70/462 |

(Continued)

OTHER PUBLICATIONS

SpecialChemSA—Omnexus, "Thermal Insulation: Why is plastic a good insulator?", Dec. 22, 2015, Omnexus. (Year: 2015).*

*Primary Examiner* — Christine M Mills
*Assistant Examiner* — Faria F Ahmad
(74) *Attorney, Agent, or Firm* — Snell & Wilmer L.L.P

(57) ABSTRACT

Disclosed is a strike assembly comprising a strike plate, a back plate and a thermal bar. The thermal bar can be situated between the strike plate and the back plate. The thermal bar can have a resistivity greater than the resistivity of the strike plate.

Also disclosed is a strike assembly comprising a strike plate and a thermal bar. The strike plate can define a circular hole and can comprise a protruding sleeve extending from the strike plate. The strike plate can define an elongated slot. The thermal bar can define a first elongated slot and a second elongated slot. The circular hole of the strike plate can be axially in-line with the first elongated slot of the thermal bar. The protruding sleeve of the strike plate can be situated in the second elongated slot of the thermal bar.

21 Claims, 10 Drawing Sheets

(56) References Cited

U.S. PATENT DOCUMENTS

| | | | | | |
|---|---|---|---|---|---|
| 1,094,290 | A * | 4/1914 | Ames | E05B 15/0245 | 292/341.19 |
| 1,182,229 | A * | 5/1916 | Thomas | E05B 15/0205 | 70/462 |
| 1,215,384 | A * | 2/1917 | Kline | E05B 15/0205 | 292/340 |
| 1,272,115 | A * | 7/1918 | Russell | E05B 15/0245 | 292/341.19 |
| 1,295,458 | A * | 2/1919 | Erfmeyer | E05B 15/0245 | 292/341.19 |
| 1,458,637 | A * | 6/1923 | Anderson | E05B 15/0245 | 292/341.18 |
| 2,042,024 | A * | 5/1936 | Schlage | E05B 15/0205 | 292/341.18 |
| 2,094,119 | A * | 9/1937 | Flora | E05B 15/0245 | 292/341.19 |
| 2,127,891 | A * | 8/1938 | Starling | E05B 17/2003 | 292/346 |
| 2,153,080 | A * | 4/1939 | Flora | E05B 15/0245 | 292/341.19 |
| 3,095,021 | A * | 6/1963 | Schlage | B27F 5/12 | 30/167.1 |
| 3,241,873 | A * | 3/1966 | Russell | E05B 15/0205 | 292/340 |
| 3,257,139 | A * | 6/1966 | Russell | E05B 15/0245 | 292/341.18 |
| 3,265,427 | A * | 8/1966 | Williams | E05B 15/0245 | 49/504 |
| 3,287,055 | A * | 11/1966 | Schlage | E05B 15/0255 | 292/341.12 |
| 3,649,060 | A * | 3/1972 | Ruff | E06B 3/365 | 292/147 |
| 4,024,739 | A * | 5/1977 | Kaufman | E05B 65/087 | 292/108 |
| 4,058,332 | A * | 11/1977 | DiFazio | E05C 1/04 | 292/147 |
| 4,065,162 | A * | 12/1977 | Schlage | E05B 15/0205 | D8/344 |
| 4,105,235 | A * | 8/1978 | Thiel | E05B 15/0245 | 292/341.18 |
| 4,186,954 | A * | 2/1980 | Detlefs | E05B 15/0205 | D8/344 |
| D293,879 | S * | 1/1988 | Sundberg | D8/343 | |
| D301,972 | S * | 7/1989 | Lozano | D8/343 | |
| 4,865,370 | A * | 9/1989 | Francis | E05B 15/0205 | 292/346 |
| 5,118,151 | A * | 6/1992 | Nicholas, Jr. | E05B 15/0245 | 292/341.19 |
| 5,171,050 | A * | 12/1992 | Mascotte | E05B 15/025 | 292/340 |
| 5,257,841 | A * | 11/1993 | Geringer | E05B 45/083 | 292/DIG. 60 |
| 5,328,217 | A * | 7/1994 | Sanders | E05B 15/0245 | 292/341.19 |
| 5,421,627 | A * | 6/1995 | Yane | E05B 1/0015 | 292/101 |
| 5,542,720 | A * | 8/1996 | Fleming | E05B 63/20 | 292/341.15 |
| D375,446 | S * | 11/1996 | Nelson | D8/343 | |
| 5,586,796 | A * | 12/1996 | Fraser | E05B 15/0205 | 292/357 |
| 5,757,269 | A * | 5/1998 | Roth | E05B 45/083 | 292/DIG. 60 |
| 6,089,627 | A * | 7/2000 | Pearson | E05B 15/0205 | 292/DIG. 60 |
| D461,700 | S * | 8/2002 | Meredith | D8/344 | |
| 6,588,155 | B1 * | 7/2003 | Theune | E06B 1/52 | 49/504 |
| 6,651,390 | B2 * | 11/2003 | Camperelli | E05B 15/0205 | 49/504 |
| 7,207,608 | B2 * | 4/2007 | Monts de Oca | E05B 15/0245 | 292/341.18 |
| 7,905,058 | B2 * | 3/2011 | Massey | E05C 7/04 | 49/365 |
| 11,174,668 | B1 * | 11/2021 | Mazur | E05B 65/0025 | |
| 2005/0127692 | A1 * | 6/2005 | Sanders | E05B 15/0245 | 292/340 |
| 2008/0224486 | A1 * | 9/2008 | Anderson | E05B 15/0205 | 292/340 |
| 2014/0353989 | A1 * | 12/2014 | Nelson | E05B 15/0245 | 292/341.18 |
| 2017/0226787 | A1 * | 8/2017 | Sprague | E05F 1/06 | |

* cited by examiner

STRIKE ASSEMBLY

CROSS-REFERENCE TO RELATED APPLICATIONS

This application claims priority to U.S. Ser. No. 62/798,804 filed Jan. 30, 2019, which are hereby incorporated by reference herein in their entirety.

TECHNICAL FIELD

This disclosure relates to a strike assembly for use with a sliding door or window. More specifically, this disclosure relates to an adjustable and thermally insulated strike assembly for use with a sliding door or window.

BACKGROUND

Frames for sliding doors or sliding windows are often made of a high strength metallic material, such as aluminum, to provide the desired rigidity, strength, and styling for the door or window frames. A strike plate is typically attached to the jamb of the door or window frame to allow a hook, in its unlocked position, of a lock assembly in the sliding door or window to be inserted into a slot of the strike plate. Once the hook is inserted into the slot of the strike plate and moved to its locked position, a portion of the hook is positioned behind the strike plate to prevent the slide door or window from moving away from the jamb. Since the strike plate often needs to withstand the pulling force that may be applied to it by the hook (in its locked position), strike plates are often made of a high strength metallic material, such as aluminum. Since the metallic strike plate is typically mounted directly to the metallic jamb of the door or window frame, in cold weather, frost or icy spots may build up on the strike plate making it difficult to move the hook from the locked position to the unlocked position or to slide the sliding door or window away from the jamb even with the hook in the unlocked position. Additionally, in both cold and hot weather, undesired heat loss and/or gain can take place through the strike plate, thereby raising heating and/or cooling energy demands in the household.

Furthermore, since the strike plate often needs to be positioned (or vertically located) on the jamb of the door or window frame such that the hook (in the unlocked position) of a lock assembly can be inserted into a slot of the strike plate, it would beneficial during installation for the strike plate to be laterally (or vertically as viewed from a door or window assembly) adjustable relative to the thermal bar. A strike plate with slotted openings for which the attachment bolts are inserted could provide such lateral adjustment. However, such slotted opening on the strike plate for attachment are visible to the homeowners and, if adjusted to the extreme, may provide the appearance of poor quality and/or sloppy installation.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a strike assembly comprising a strike plate, a back plate and a thermal bar. The thermal bar can be situated between the strike plate and the back plate. The thermal bar can have a resistivity greater than the resistivity of the strike plate.

Also disclosed is a strike assembly comprising a strike plate and a thermal bar. The strike plate can define a circular hole and can comprise a protruding sleeve extending from the strike plate. The strike plate can define an elongated slot. The thermal bar can define a first elongated slot and a second elongated slot. The circular hole of the strike plate can be axially in-line with the first elongated slot of the thermal bar. The protruding sleeve of the strike plate can be situated in the second elongated slot of the thermal bar.

Also disclosed is a method for providing an adjustable strike, comprising the steps of: providing a strike plate defining a circular hole and having a protruding sleeve extending from the strike plate and defining an elongated slot, providing a thermal bar defining a first elongated slot and a second elongated slot, inserting the protruding sleeve of the strike plate into the second elongated slot of the thermal bar, sliding the strike plate longitudinally relative to the thermal bar until the elongated slot of the strike plate is in a desired location, and securing the strike plate to the thermal bar.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
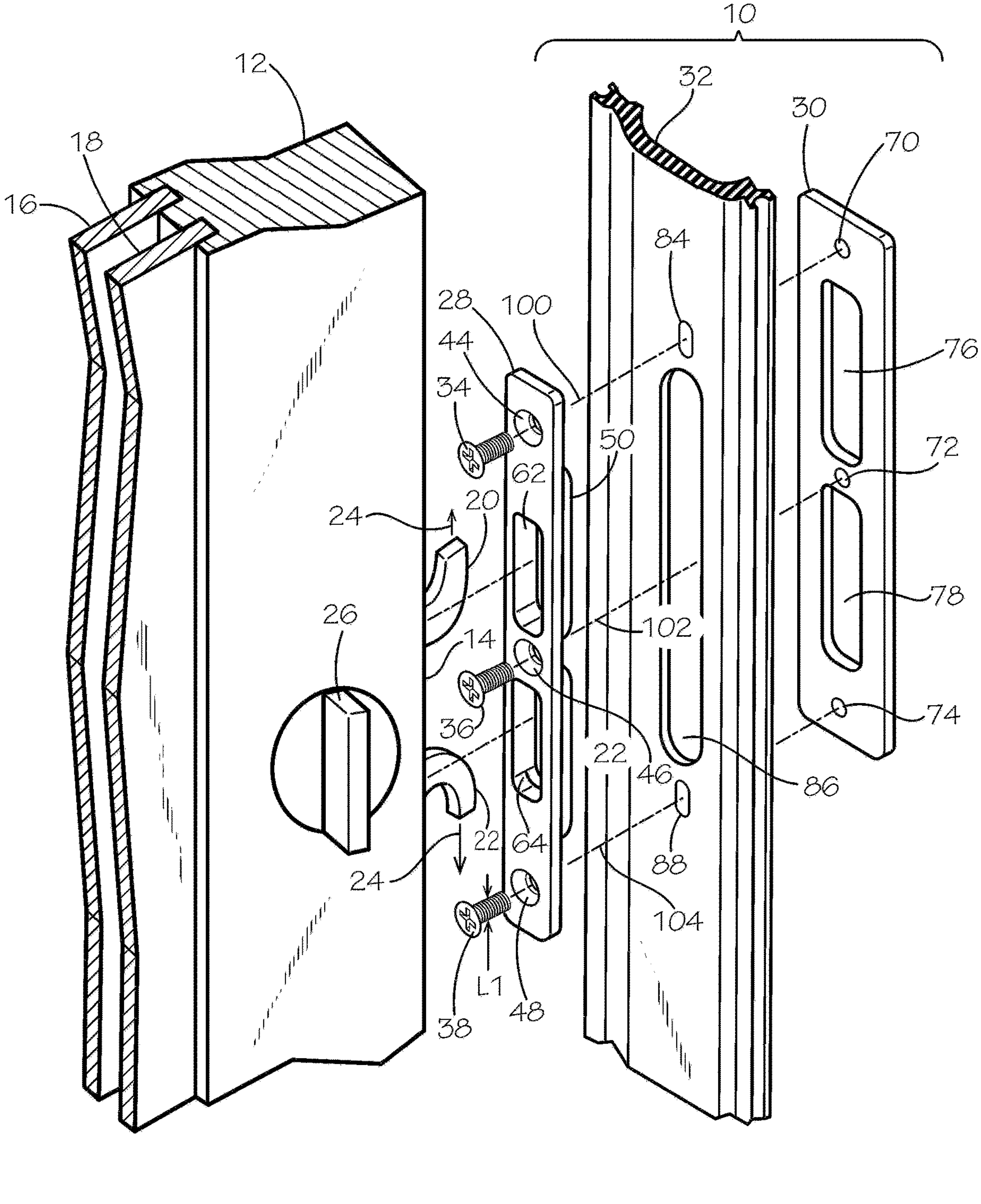
FIG. 1 is a perspective exploded view of a strike assembly comprising a strike plate, a back plate and a thermal bar in accordance with a first aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about W, L, D or substantially W, L, D on a particular measurement scale measures within a range between W, L, D plus an industry-standard upper tolerance for the specified measurement and W, L, D minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may." unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a strike assembly and associated methods, systems, devices, and various apparatus. It would be understood by one of skill in the art that the disclosed strike assembly is described in but a few exemplary aspects among many. No particular terminology or description should be considered limiting on the disclosure or the scope of any claims issuing therefrom.

Figure 2:
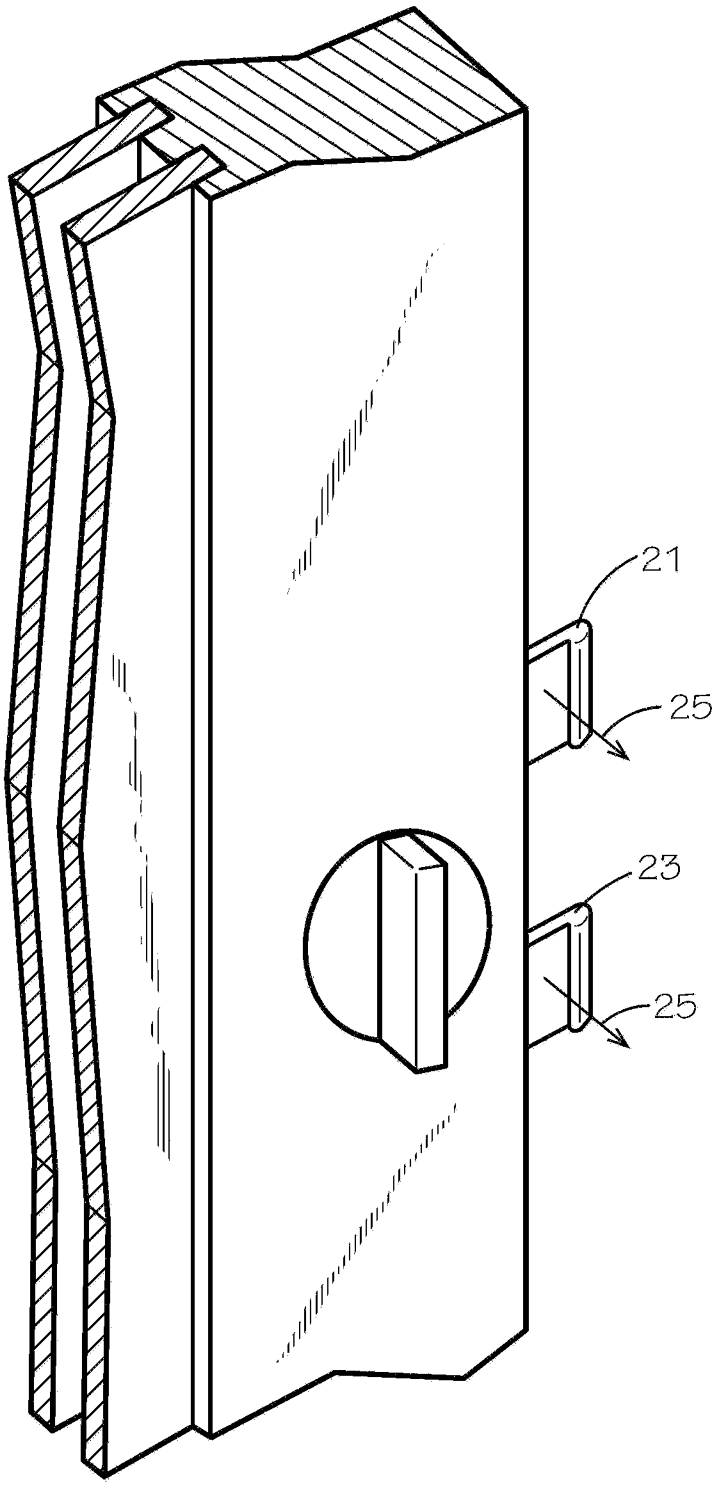
FIG. 2 is a perspective view of another aspect of hook members for use with the strike assembly illustrated in FIG. 1.

A first aspect of a strike assembly 10 is disclosed and described in FIGS. 1,3-13. FIG. 1 illustrates a strike assembly 10 for use with a locking assembly 14 of a sliding door or a sliding window 12 (that can be slid horizontally or vertically). The sliding door or window 12 illustrated in FIG. 1 is an insulated glass sliding door or window 12 comprising two panes of glass 16,18, although, the strike assembly 10 can be used with a locking assembly of other types of sliding doors or windows. The locking assembly 14 can comprise a first hook member 20 and a second hook member 22. In the unlocked position, the hook members 20,22 are retracted. In the locked position, the hooked members 20,22 are moved outwardly in the direction of arrows 24 (such that the hooks of the hook members 20,22 can engage catches 51,53, shown in FIG. 4, of a strike plate 28). A lever 26 can be mounted to the sliding door or window 12. The lever 26 can be turned in one direction to move the hook members 20,22 from the unlocked position to the locked position and can be turned in the opposite direction to move the hook members 20,22 from the locked position to the unlocked position. It should be noted the locking assembly 14, its hook members 20,22 and its lever 26 are for illustrative purposes only and can be configured differently in other aspects. The strike assembly 10 disclosed and described herein can be used with other locking assemblies, including but not limited to: 1) a key in place of lever 26, 2) a first button that can be pushed to move the hook members 20,22 from the unlocked position to the locked position and a second button that can be pushed to move the hook members 20,22 from the locked position to the unlocked position, 3) a plate that can be slid in one direction to move the hook members 20,22 from the unlocked position to the locked position and slid in the opposite direction to move the hooks members 20,22 from the locked position to the unlocked position and 4) alternative hook members 21,23, illustrated in FIG. 2, that are each curved along its longitudinal terminal end and are moved in the direction of arrows 25 upon moving the hook members 21,23 from the unlocked position to the locked position (such that the hooks of the hook members 21,23 can engage longitudinal catches, not shown, of a strike plate).

As shown in FIG. 1, the strike assembly 10 can comprise a strike plate 28 (or front face plate), a back plate 30, a thermal bar 32 (or thermal strut or insulating bar or thermal break or vacuum plate) forming a portion of a jamb, a first bolt 34, a second bolt 36 and a third bolt 38. It should be noted that other fasteners, including but not limited to screws and rivets, may be used in place of bolts. Each bolt 34,36,38 can define a diameter L1. It should be noted that while the term "jamb" is often used for the vertical structural member of a door frame, for the purposes of the various aspects disclosed herein, the jamb can also be the vertical structural member (sometimes also referred to as the stile) of another bi-parting sliding door. Furthermore, as mentioned earlier, the strike assembly 10 can be used with a sliding door or a sliding window. Hence, the jamb can also be the vertical structural member of a window frame for a horizontally sliding window, the vertical structural member of another bi-parting horizontally sliding window, the horizontal structural member of a window frame for a vertically sliding window, or the horizontal structural member of another bi-parting vertically sliding window.

Figure 3:
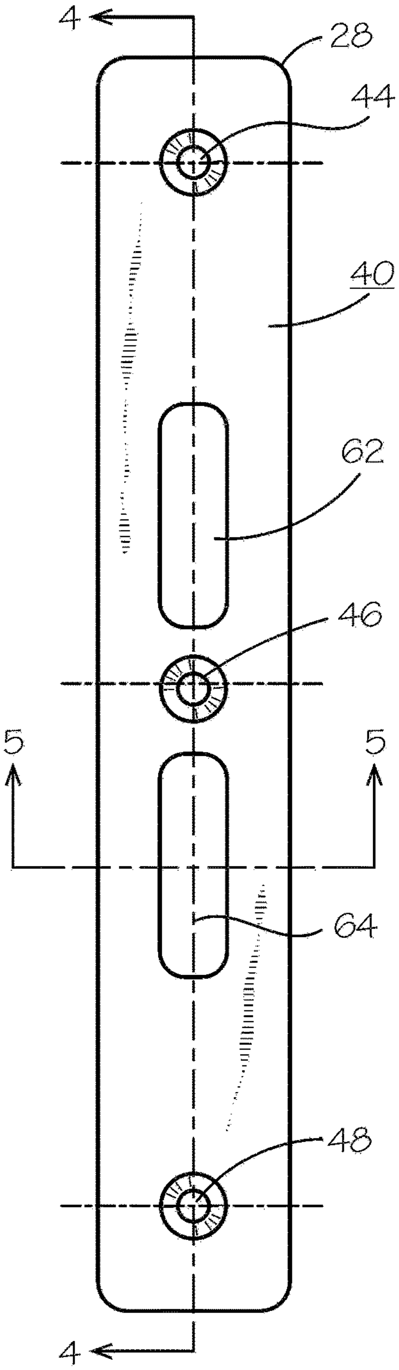
FIG. 3 is a front view of the strike plate illustrated in FIG. 1.
Figure 4:
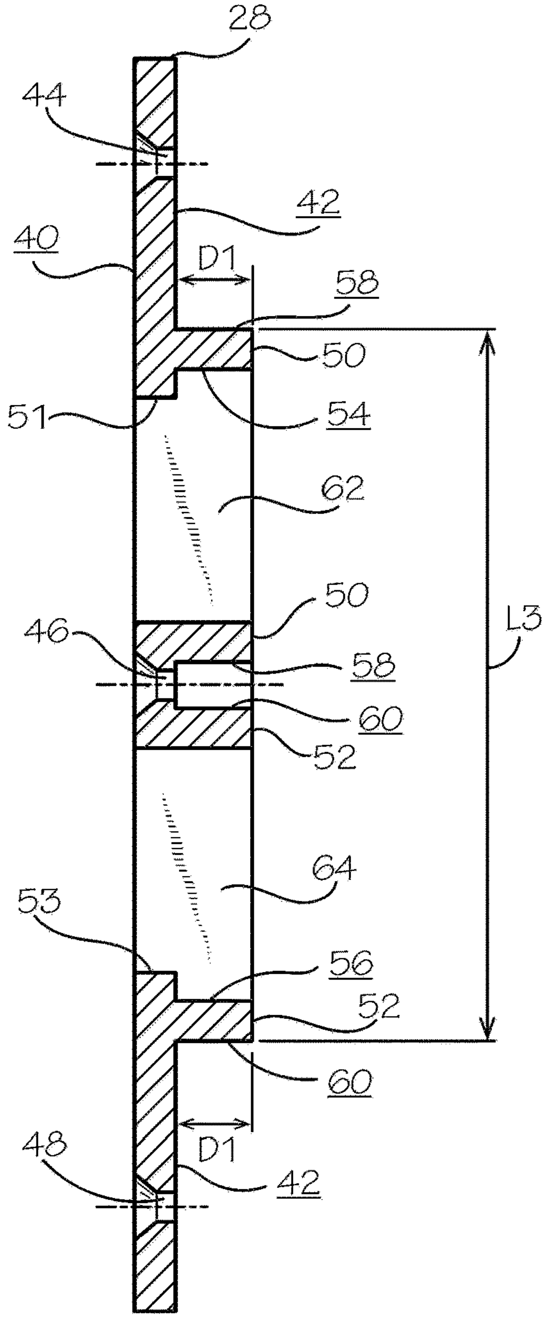
FIG. 4 is a cross-sectional view of the strike plate along line 4-4 as shown in FIG. 3.
Figure 5:
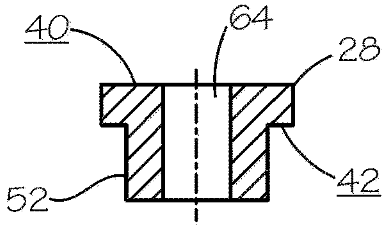
FIG. 5 is a cross-sectional view of the strike plate along line 5-5 as shown in FIG. 3.

The strike plate 28 is illustrated in FIGS. 3-5. The illustrated strike plate 28 can be formed of aluminum, although in other aspects, the strike plate 28 can be formed of other high strength metallic material, including but limited to zinc alloy, or even non-metallic materials such as high-strength plastic in some aspects. The strike plate 28 defines a front surface 40 and a back surface 42 (shown in FIG. 4). The strike plate 28 can define a first circular hole 44, a second circular hole 46 and a third circular hole 48, each optionally chamfered at the front surface 40. The first circular hole 44 can be sized to accommodate the first bolt 34. The second circular hole 46 can be sized to accommodate the second bolt 36. The third circular hole 48 can be sized to accommodate the third bolt 38. The holes 44,46,48 can be chamfered to allow the bolts 34,36,38, which can be countersunk bolts, to be flush with the front surface 40 of the strike plate 28. As shown in FIG. 4, the strike plate 28 can comprise two oblong shaped sleeves 50,52 extending rearward from the back surface 42 of the strike plate 28. Each sleeve 50,52 can define a radially inner surface 54,56 and a radially outer surface 58,60. The radially inner surface 54,56 of each sleeve 50,52 can define an elongated slot 62,64, as shown in FIG. 3. Each sleeve 50,52 can define a depth D1 (shown in FIG. 4) from the back surface 42 of the strike plate 28 to the rearward most edge of the sleeve. The radially outer surfaces 58,60 of sleeves 50,52 can define an overall longitudinal length L3. The strike plate 28 can further comprise two catches 51,53, each extending radially inwardly from the lateral outer end of the radially inner surface 54,56 of the sleeve 50,52. The front surface of each catch 51,53 can be flush with the front surface 40 of the strike plate 28. Each hook of the hook member 20,22 (shown in FIG. 1), in its locked position, can engage the corresponding catch 51,53 of the strike plate 28 to prevent the sliding door or sliding window 12 from being moved away (or pulled) from the strike assembly 10.

Figure 6:
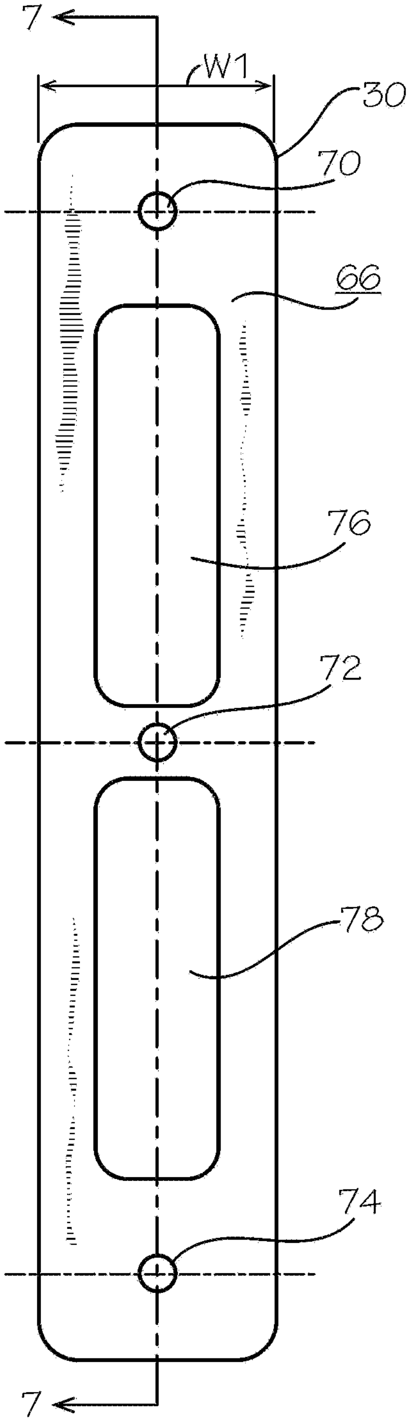
FIG. 6 is a front view of the back plate illustrated in FIG. 1.
Figure 7:
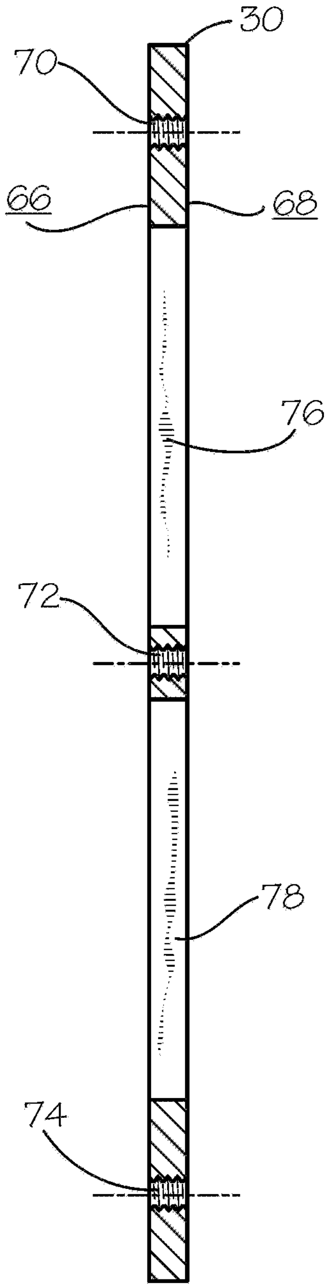
FIG. 7 is a cross-sectional view of the back plate along line 7-7 as shown in FIG. 6.

The back plate 30 is illustrated in FIGS. 6-7. The illustrated back plate 30 can be formed of aluminum, although in other aspects, the back plate 30 can be formed of other high strength metallic material, or even non-metallic materials such as high-strength plastic in some aspects. The back plate 30 can define a front surface 66 and a back surface 68 (shown in FIG. 7). The back plate 30 can define a width W1 (shown in FIG. 6). The back plate 30 can define a first threaded circular hole 70, a second threaded circular hole 72, a third threaded circular hole 74, a first elongated slot 76, and a second elongated slot 78. The first circular hole 70 can be sized and threaded to accommodate and engage the first bolt 34. The second circular hole 72 can be sized and threaded to accommodate and engage the second bolt 36. The third circular hole 74 can be sized and threaded to accommodate and engaged the third bolt 38. The first elongated slot 76 can accommodate the first sleeve 50 of the strike plate 28 and can be sized slightly larger than the radially outer surface 58 of the first sleeve. The second elongated slot 78 can accommodate the second sleeve 52 of the strike plate 28 and can be sized slightly larger than the radially outer surface 60 of the second sleeve.

Figure 8:
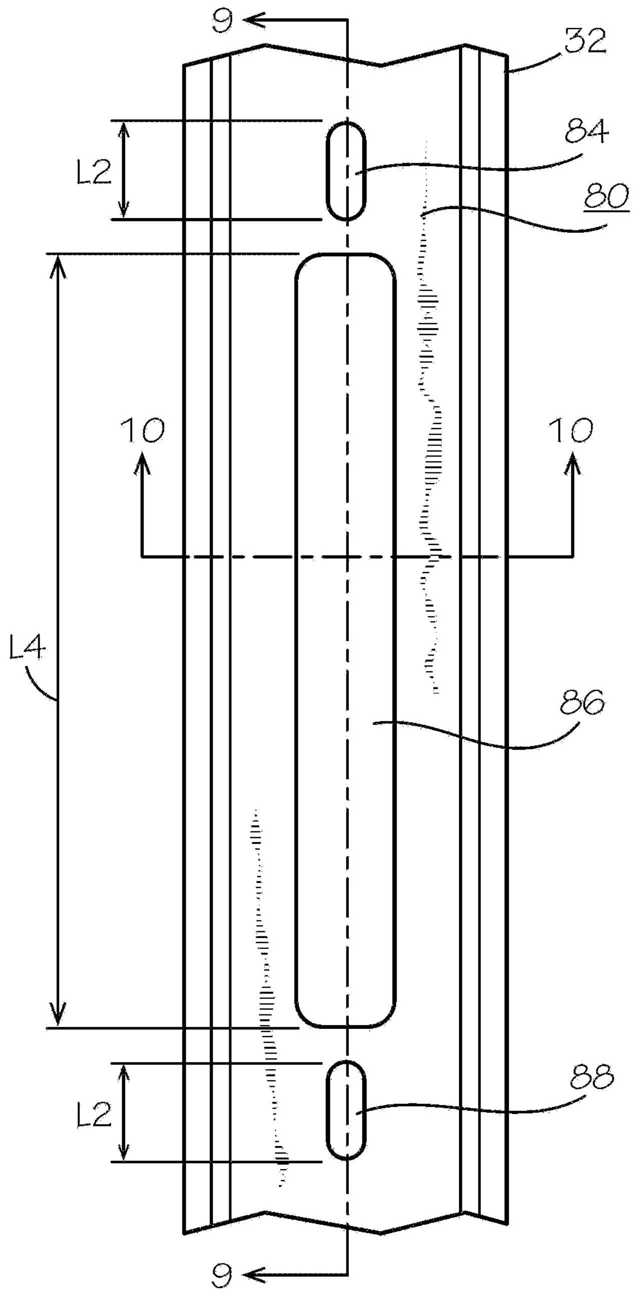
FIG. 8 is a front view of the thermal bar illustrated in FIG. 1.
Figure 9:
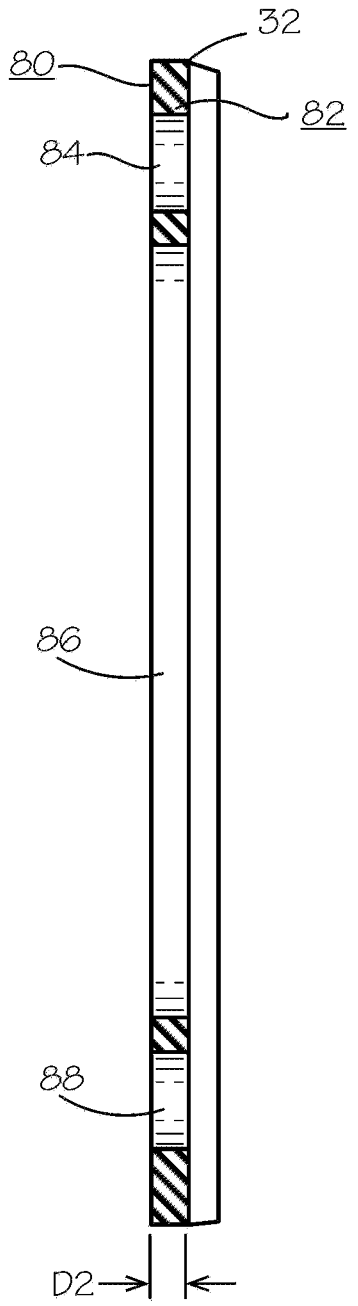
FIG. 9 is a cross-sectional view of the thermal bar along line 9-9 as shown in FIG. 8.
Figure 10:
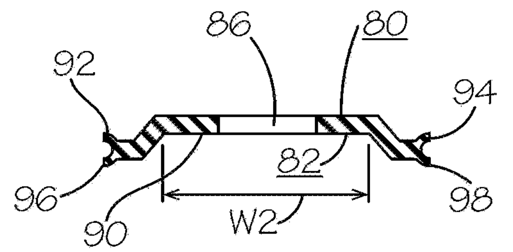
FIG. 10 is a cross-sectional view of the thermal bar along line 10-10 as shown in FIG. 8.

A partial section of the thermal bar 32 is illustrated in FIGS. 8-10. The illustrated thermal bar 32 can be formed of a material that has higher thermal resistivity (or lower thermal conductivity) than the material forming the strike plate. Such higher resistivity material can be, for example and without limitation, a polymeric material, more specifically a polyamide glass fiber component (or glass filled nylon). The polyamide for the polyamide glass fiber component can be nylon 6, nylon 66, nylon 12, or other suitable nylons. The glass fill provides increased rigidity, strength, and surface hardness to the thermal bar 32. The thermal bar 32 can form a portion of a jamb that can be part of a door or window frame or part of another sliding bi-parting door or bi-parting window. The thermal bar 32 can define a front surface 80 and a back surface 82. The thermal bar can define a first elongated slot 84, a second elongate slot 86 and a third elongated slot 88. The first slot 84 can accommodate the first bolt 34 and the first slot 84 can be sized so as to allow the first bolt 34 to move longitudinally in the first slot. The third slot 88 can accommodate the third bolt 38 and the third slot 88 can be sized so as to allow the third bolt 38 to move longitudinally in the third slot. The first slot 84 and the third slot 88 each can define a longitudinal length L2 (shown in FIG. 8). The second slot 86 can accommodate the sleeves 50,52 of the strike plate 28. The second slot 86 can define a longitudinal length L4. The thermal bar 32 can define a depth (or thickness) D2 (shown in FIG. 9). The depth D2 of the thermal bar can be less than the depth D1 (shown in FIG. 4) of each sleeve 50,52, such that once the front surface 80 of the thermal bar 30 is adjacent to the back surface 42 of the strike plate 28, a portion of each sleeve 50,52 extends from the back surface 82 of the thermal bar 32.

The thermal bar 32 can define a channel 90 (shown in FIG. 10) to accommodate the strike plate 28 therein. A width W2 of the channel 90 can be sized slightly wider than the width W1 (shown in FIG. 6) of the back plate 30 to allow the back plate 30 to slide longitudinally in the channel 90. A first finger 92 and a second finger 94 extend from the edges of the front surface 80 of the thermal bar 86 (shown in FIG. 10). A first finger 96 and a second finger 94 extend from the edges of the back surface 82 of the thermal bar 86 (shown in FIG. 10). The first finger 92 extending from the front surface 80 and the first finger 96 extending from the back surface 82 can allow the thermal bar 32 to securely engage with and attached to another member of the jamb, which can be formed of a metallic material having a lower resistivity than the resistivity of the thermal bar 32. Likewise, the second finger 94 extending from the front surface 80 and the second finger 98 extending from the back surface 98 can allow the thermal bar to securely engage with and attached to another member of the jamb which can be formed of a metallic material having a lower resistivity than the resistivity of the thermal bar 32.

The length L2 (shown in FIG. 8) of the first slot 84 and the third slot 88 can be larger than the diameter L1 (shown in FIG. 1) of the first bolt 34 and third bolt 38 to allow the strike plate 28 to move laterally a certain distance X (not shown) for any adjustments that may necessary, as discussed later, after the sleeves 50,52 have been inserted into the second slot 86. Hence, the length L2 of the first slot 84 (or third slot 88) can be approximately the diameter L1 of the first bolt 34 (or third bolt 38) plus the distance X for adjustment. The length L4 (shown in FIG. 8) of the second slot 86 can likewise be larger than the overall longitudinal length L3 (shown in FIG. 4) of the radially outer surfaces 58,60 of sleeves 50,52 to allow the strike plate 28 to move laterally a certain distance X for any adjustments that may be necessary after the sleeves 50,52 have been inserted into the second slot 86. Hence, the length L4 of the second slot 86 can be approximately the overall length L3 of the sleeves 50,52 plus the distance X for adjustment. The adjustment distance X can be, for example and without limitation, ⅜ of an inch or some other desirable adjustment distance.

Referring back FIG. 1, the strike plate 28 can be adjustable longitudinally (or vertically as viewed from a door or window assembly) relative to the thermal bar 32. This ability to adjust the strike plate 28 longitudinally allows the first hook member 20 to be inserted into the first slot 62 of the strike plate 28 when the first hook member is in the unlocked position and allows second hook member 22 to be inserted into the second slot 64 of the strike plate 28 when the second hook member is in the unlocked position. The steps for installing the strike plate 28 to the thermal bar 32 to assemble the strike assembly 10 can be as follows. The strike plate 28 can be positioned in front of the thermal bar 32 such that the back surface 42 of the strike plate 28 is adjacent to the front surface 80 of the thermal bar 32 and the first sleeve 50 and the second sleeve 52 of the strike plate 28 are situated in the second slot 86 of the thermal bar 32. Upon the strike plate 28 positioned in front of the thermal bar 32, the first circular hole 44 of the strike plate 28 is in-line with the first slot 84 of the thermal bar 32 along line 100 and the third circular hole 48 of the strike plate 28 is in-line with the third slot 88 of the thermal bar 32 along line 104. "In-line" refers to the axes of the holes or other openings, such as slots, being generally aligned on the same axial line such that an elongated object, such as a bolt or a hook, can extend through both openings. It should be noted that "in-line" does not imply that the axes of the openings are in perfect alignment but only that the openings are aligned such that an elongated object can extend through the openings.

Once the strike plate 28 has been positioned in front of the thermal bar 32, the back plate 30 is placed behind the thermal bar 32 such that front surface 66 of the back plate is adjacent to the back surface 82 of the thermal bar, the portion of the first sleeve 50 extending beyond the back surface 82 of the thermal bar is situated in the first slot 76 of the back plate, and the portion of the second sleeve 52 extending beyond the back surface of the thermal bar is situated in the second slot 78 of the back plate. At this position, the first circular hole 44 of the strike 28, the first elongated slot 84 of the thermal bar 32, and the first circular hole 70 of the back plate 30 are in-line along line 100 (shown in FIG. 1). The second circular hole 46 of the strike plate 28, the second elongated slot 86 of the thermal bar 32, and the second circular hole 72 of the back plate 30 are in-line along line 102 (shown in FIG. 1). The third circular hole 48 of the strike plate 28, the third elongated slot 88 of the thermal bar 32, and the third circular hole 74 of the back plate 30 are in-line along line 104 (shown in FIG. 1). Furthermore, the first slot 62 of the strike plate 28 is in-line with the first slot 76 of the back plate 30 to form a single slot for the first hook member 20 to be inserted into. The second slot 64 of the strike plat 28 is in-line with the second slot 78 of the back plate 30 to form a slot for the second hook member 22 to be inserted into.

As discussed earlier, the length L2 of the first and third slots 84,88 of the thermal bar 32 is larger than the diameter L1 of the first and third bolts 34,38 by adjustment distance X and the length L4 of the second slot 86 of the thermal bar 32 is larger than the overall longitudinal length L3 of the first and second sleeves 50,52 by adjustment distance X. The extra lengths of first, second and third slots 84,86,88 permit the strike plate 28 to be adjustable by adjustment distance X while still allowing: 1) the first hole 44 of the strike plate 28 and the first hole 70 of the back plate 30 to be in-line with the first slot 84 of the thermal bar 32 (such that the first bolt 34 extends through the first hole 44 of the strike plate and the first slot 84 of the thermal bar to engage the first hole 70 of the back plate), 2) the second hole 46 of the strike plate 28 and the second hole 72 of the back plate 30 to be in-line with the second slot 86 of the thermal bar 32 (such that the second bolt 36 extends through the second hole 46 of the strike plate and the second slot 86 of the thermal bar to engage the second hole 72 of the back plate), 3) the third hole 48 of the strike plate 28 and the third hole 74 of the back plate 30 to be in-line with the third slot 88 of the thermal bar 32 (such that the third bolt 38 extends through the third hole 48 of the strike plate and the third slot 88 of the thermal bar to engage the third hole 74 of the back plate), and 4) the first and second slots 62,64 of the strike plate to be in-line with the second slot 86 of the thermal bar 32 (such that the first hook member 20 in is unlocked position extends through the first slot 62 of the strike plate and the second slot 86 of the thermal bar and the second hook member 22 in its unlocked position extends through the second slot 64 of the strike plate and the second slot 86 of the thermal bar).

Figure 11:
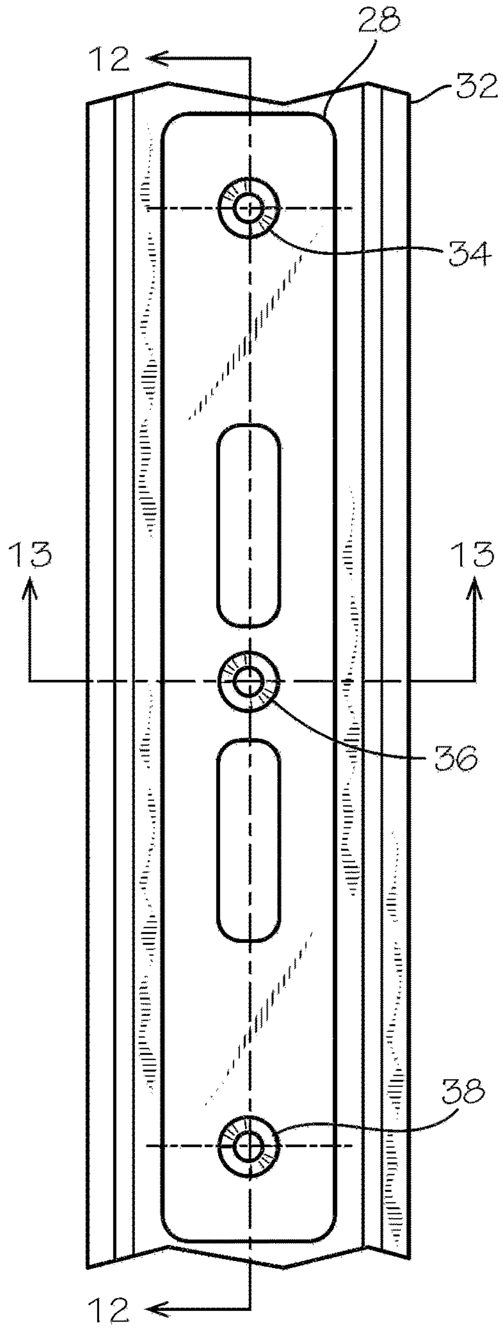
FIG. 11 is a front view of the strike assembly illustrated in FIG. 1 as assembled.
Figure 12:
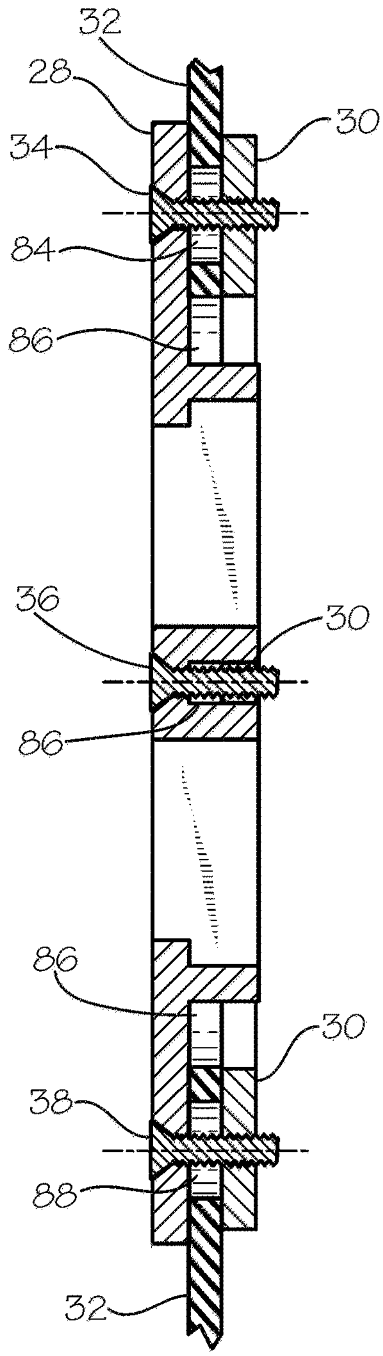
FIG. 12 is a cross-sectional view of the strike assembly along line 12-12 as shown in FIG. 11.
Figure 13:
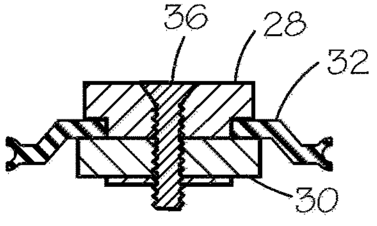
FIG. 13 is a cross-sectional view of the strike assembly along line 13-13 as shown in FIG. 11.

After the strike plate 28 is placed in front of the thermal bar 32 and the back plate 30 is placed behind the thermal bar 32 (as shown in FIGS. 11-13), the first bolt 34 is inserted through the first circular hole 44 of the strike plate and the first slot 84 of the thermal bar to engage the threading of first circular hole 70 of the back plate (as shown in FIG. 1). The second bolt 36 is inserted through the second circular hole 46 of the strike plate and the second slot 86 of the thermal bar to engage the threading of the second circular hole 72 of the back plate. The third bolt 38 is inserted through the third circular hole 48 of the strike plate and the third slot 88 of the thermal bar to engage the threading of the third circular hole 74 of the back plate. With the bolts 34,36,38 not fully tightened, the strike plate 28 and the back plate 30 can slide longitudinally relative to the thermal bar 32 until they are in a desired position or location, such that the first and second hook members 20,22 (in the retracted unlocked position) can be inserted into the first and second slots 62,64 of the strike plate 28 upon the sliding door or window 12 moved to the closed location. Once the strike plate 28 and the back plate 30 are in a desired position or location, the bolts 34,36,38 are fully tightened to secure the strike plate 28 and back plate 32 to the thermal bar 32. Since the first slot 84, the second slot 86, and the third slot 88 of thermal bar 32 are covered by the strike plate 28 once the strike assembly 10 is fully assembled, the excess slot openings (to permit adjustability of the strike plate relative to the thermal bar by adjustment distance X) of the first slot 84, the second slot 86 and the third slot 88 of the thermal bar will not be visible to the homeowners and hence concealed.

With the strike plate 28 and the back plate 30 secured to the thermal bar 32 forming a portion of a jamb, the strike assembly 10 is able to withstand substantial pulling force (that may be exerted by the hook members 20,22 in their locked position). For the disclosed aspect, the strike assembly is able to pass 850 lbf of pulling force during forced intrusion testing.

Figure 14:
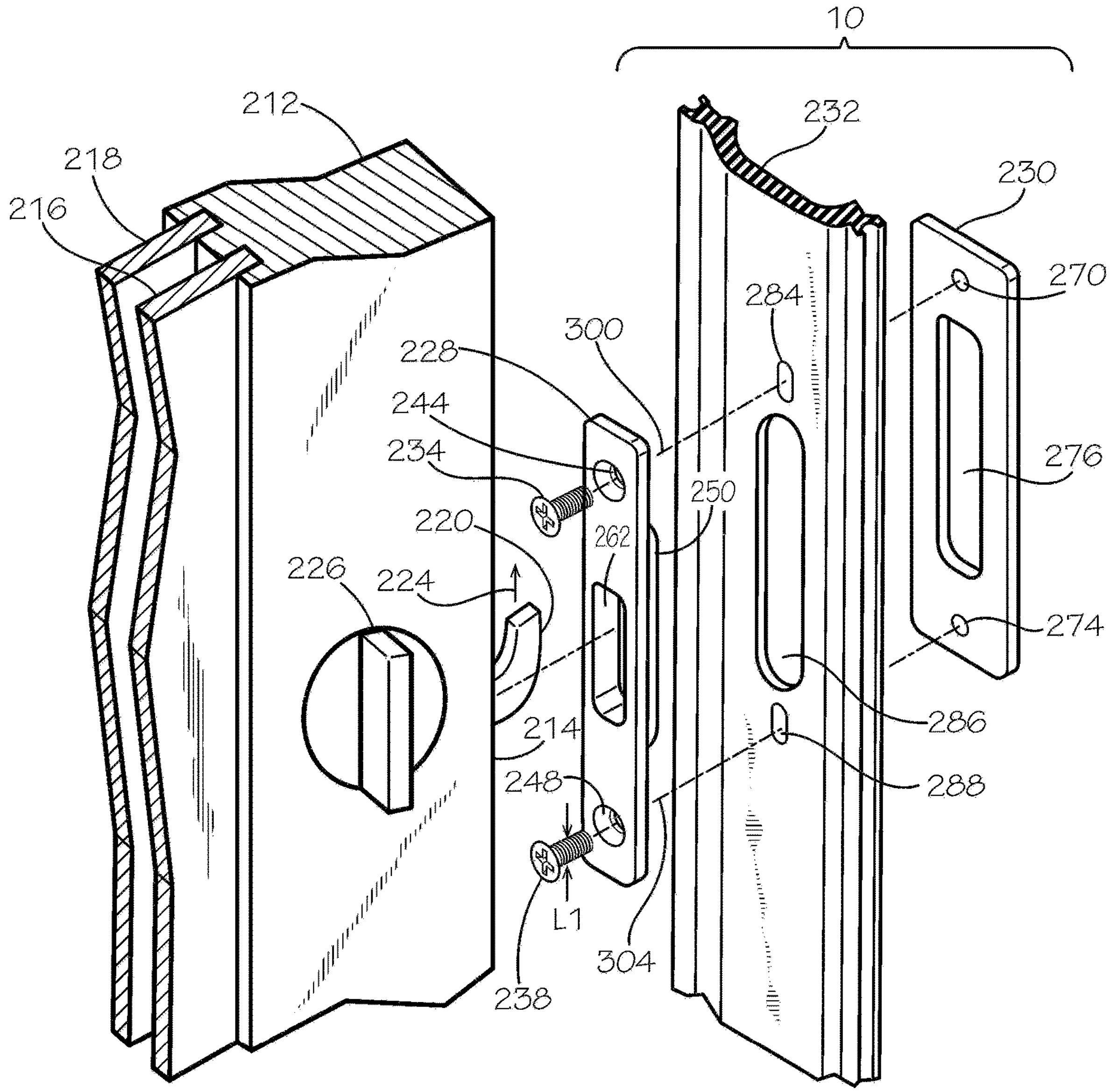
FIG. 14 is a perspective exploded view of a strike assembly comprising a strike plate, a back plate and a thermal bar in accordance with a second aspect of the present disclosure.

A second aspect of a strike assembly 210 is disclosed and described in FIGS. 14-21. The strike assembly 210 is similar to the strike assembly 10 of the first aspect with the exception that the strike assembly 210 of the second aspect can be used with a locking assembly with one hook member. FIG. 14 illustrates a strike assembly 210 for use with a locking assembly 214 of a sliding door or window 212. The sliding door or window 212 illustrated in FIG. 14 is an insulated glass sliding door or window, having two panes of glass 216,218, although, the strike assembly 210 can be used with a locking assembly of other types of sliding doors or windows. The locking assembly 214 can comprise a hook member 220. In the unlocked position, the hook member 220 is retracted. In the locked position, the hooked member 220 is extended outwardly in the direction of arrow 224 (such that the hook of the hook member 220 can engage catch 251, shown in FIG. 16, of a strike plate 228). A lever 226 can be mounted to the sliding door or window 212. The lever 226 can be turned in one direction to move the hook member 220 from an unlocked position to a locked position and can be turned in the opposite direction to move the hook member 220 from a locked position to an unlocked position. It should be noted the locking assembly 214, its hook member 220 and its lever 226 are for illustrative proposes only. The strike assembly 210 disclosed and described herein can be used with other locking assemblies. The strike assembly 210 can comprise a strike plate (or front face plate) 228, a back plate (or thermal break) 230, a thermal bar (or thermal strut or insulating bar or thermal break or a vacuum plate) 232 forming a portion of a jamb, a first bolt 234 and a second bolt 238. Each bolt 234,238 can define a diameter L1. It should be noted that while the term "jamb" is often used for the vertical structural member of a door frame, for this patent application, the jamb can also be the vertical structural member of another bi-parting sliding door, the vertical structural member of a window frame for a horizontally sliding window, the vertical structural member of another bi-parting horizontally sliding window, the horizontal structural member of a window frame for a vertically sliding window, or the horizontal structural member of another bi-parting vertical sliding window.

Figure 15:
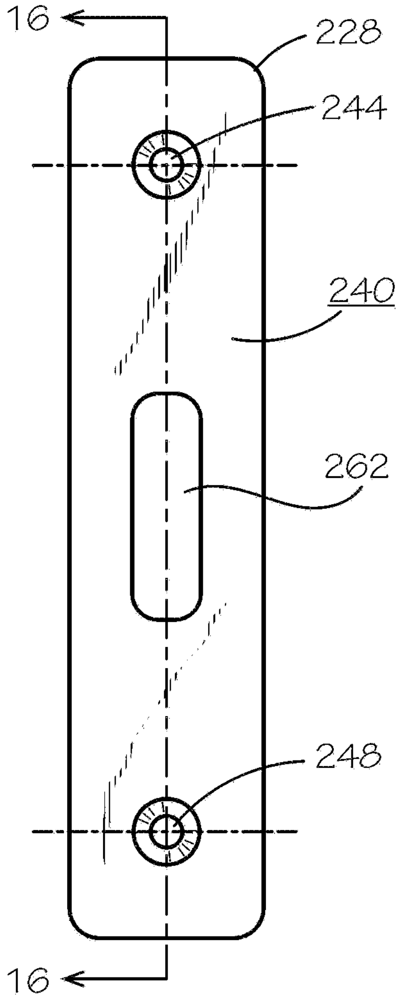
FIG. 15 is a front view of the strike plate illustrated in FIG. 14.
Figure 16:
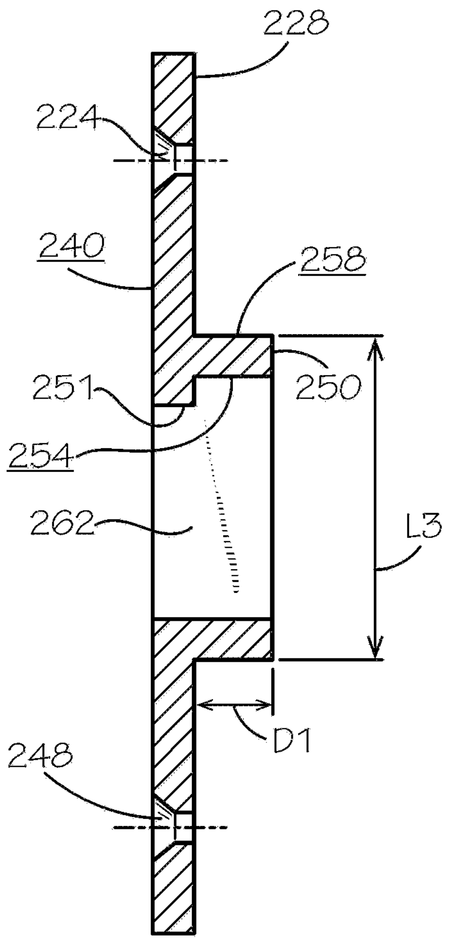
FIG. 16 is a cross-sectional view of the strike plate along line 16-16 as shown in FIG. 15.

The strike plate 228 is illustrated in FIGS. 15-16. The illustrated strike plate 228 can be formed of aluminum, although in other aspects, the strike plate 228 can be formed of other high strength metallic material, including but not limited to zinc alloy, or even non-metallic materials such as high-strength plastic in some aspects. The strike plate 228 defines a front surface 240 and a back surface 242 (shown in FIG. 16). The strike plate 228 can define a first circular hole 244, and a second circular hole 248 each optionally chamfered at the front surface 240. The first circular hole 244 can be sized to accommodate the first bolt 234. The second circular hole 248 can be sized to accommodate the second bolt 238. The holes 244,248 can be chamfered to allow the bolts 234,238, which can be countersunk bolts, to be flush with the front surface 240 of the strike plate 228. As shown in FIG. 16, the strike plate 228 can comprises an oblong shaped sleeve 250 extending rearward from the back surface 242 of the strike plate 228. The sleeve 250 can define a radially inner surface 254 and a radially outer surface 258. The radially inner surface 254 of the sleeve 250 can define an elongated slot 262. The strike plate 28 can further comprise a catch 251 extending radially inwardly from the lateral upper end of the radially inner surface 254 of the sleeve 250. The front surface of the catch 251 can be flush with the front surface 240 of the strike plate 228. The hook of the hook member 220 (shown in FIG. 14), in its locked position, can engage the catch 251 of the strike plate 228 to prevent the sliding door or sliding window 212 from being moved away (or pulled) from the strike assembly 210.

Figure 17:
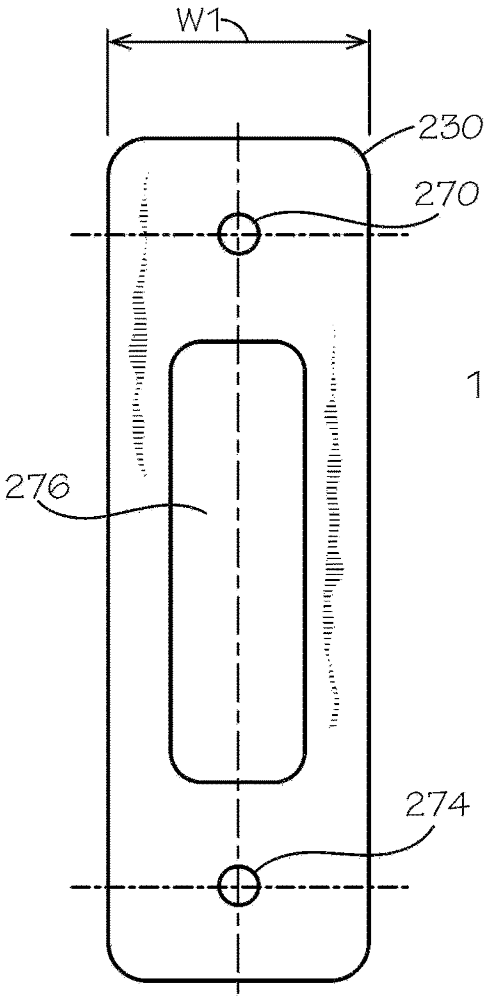
FIG. 17 is a front view of the back plate illustrated in FIG. 14.

The back plate 230 is illustrated in FIG. 17. The illustrated back plate 230 can be formed of aluminum, although in other aspects, the back plate 230 can be formed of other high strength metallic material, or even non-metallic materials such as high-strength plastic in some aspects. The back plate 230 can define a width W1. The back plate 230 can define a first threaded circular hole 270, a second threaded circular hole 274, and an elongated slot 276. The first circular hole 270 can be sized and threaded to accommodate and engage the first bolt 234. The second circular hole 274 can be sized to accommodate and engage the second bolt 238. The elongated slot 276 can accommodates the sleeve 250 of the strike plate 228 and is sized slightly larger than the radially outer surface 258 of the sleeve.

Figure 18:
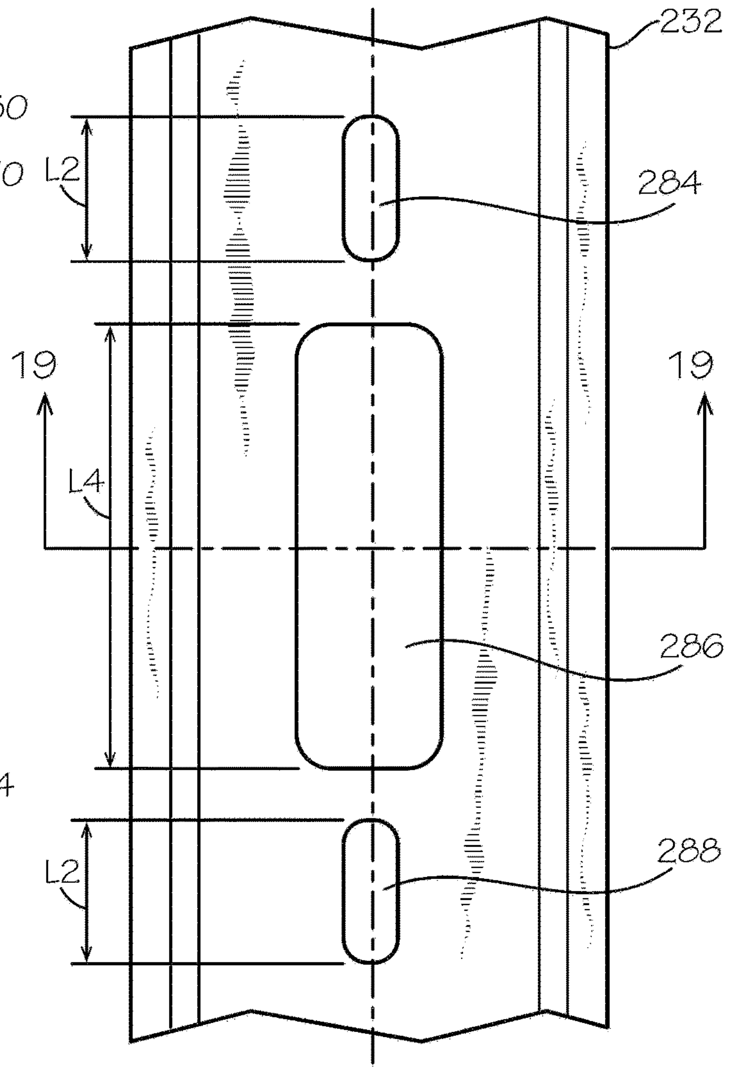
FIG. 18 is a front view of the thermal bar illustrated in FIG. 14.
Figure 19:
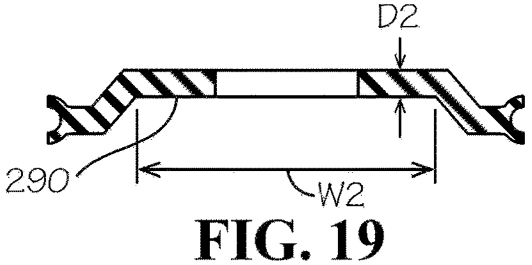
FIG. 19 is a cross-sectional view of the thermal bar along line 19-19 as shown in FIG. 18.

A partial section of the thermal bar 232 is illustrated in FIGS. 18-19. The illustrated thermal bar 232 can be formed of a material that has higher resistivity (or lower conductivity) than the material forming the strike plate. Such higher resistivity material can be, for example and without limitation, a polymeric material, more specifically a polyamide glass fiber component (or glass filled nylon). The polyamide for the polyamide glass fiber component can be nylon 6, nylon 66, nylon 12 or other suitable nylons. The glass fill provides increased rigidity, strength and surface hardness to the thermal bar 232. The thermal bar 232 can form a portion of a jamb that can be part of a door or window frame or part of another sliding bi-parting door or bi-parting window. The thermal bar can define a first elongated slot 284, a second elongate slot 286 and a third elongated slot 288. The first slot 284 can accommodate the first bolt 234 and the first slot 284 can be sized so as to allow the first bolt 234 to move longitudinally in the first slot. The third slot 288 can accommodate the second bolt 238 and the third slot 288 can be sized so as to allow the second bolt 238 to move longitudinally in the third slot. The first slot 284 and the third slot 288 each can define a longitudinal length L2. The second slot 286 can accommodate the sleeve 250 of the strike plate 228. The second slot 286 can define a longitudinal length L4. The thermal bar 232 can define a depth (or thickness) D2 (shown in FIG. 19). The depth D2 of the thermal bar can be less than the depth D1 (shown in FIG. 16) of the sleeve 250, such that once the thermal bar 232 is adjacent to the back surface 242 of the strike plate 228, a portion of the sleeve 250 extends from the thermal bar 232. The thermal bar 232 can define a channel 290 (shown in FIG. 19) to accommodate the strike plate 228. The width W2 of the channel 290 can be sized slightly wider than the width W1 of the strike plate 28 to allow the strike plate 228 to slide longitudinally in the channel 290.

The length L2 of the first slot 284 and the third slot 288 can be larger than the diameter L1 of the first bolt 234 and second bolt 238 to allow the strike plate 228 to move laterally a certain distance X (not shown in figures) for any adjustments that may necessary, to discussed later, after the sleeve 250 has been inserted into the second slot 86. Hence, the length L2 of the first slot 284 (or third slot 288) can be approximately the diameter L1 of the first bolt 234 (or third bolt 238) plus the distance X for adjustment. The length L4 of the second slot 286 (shown in FIG. 16) can likewise be larger than the longitudinal length L3 of the radially outer surface 258 of sleeve 250 to allow the strike plate 228 to move laterally a certain distance X for any adjustments that may be necessary after the sleeve 250 has been inserted into the second slot 286. Hence, the length L4 of the second slot 286 can be approximately the length L3 of the sleeve 250 plus the distance X for adjustment. The adjustment distance X can be, for example and without limitation, ⅜ of an inch or some other distance that may be desirable.

Referring back FIG. 14, the strike plate 228 can be adjustable longitudinally relative to the thermal bar 232. This ability to adjust the strike plate 228 longitudinally allows the hook member 220 to be inserted into the slot 262 of the strike plate 228 when the hook member is in unlocked position. The steps for installing the strike plate 228 to the thermal bar 232 to assemble the strike assembly 210 can be as follows. The strike plate 228 can be positioned in front of the thermal bar 232 such that the sleeve 250 of the strike plate 228 is situated in the slot 286 of the thermal bar 232. Upon the strike plate 228 positioned in front of the thermal bar 232, the first circular hole 244 of the strike plate 228 is in-line with the first slot 284 of the thermal bar 232 along line 300 and the second circular hole 248 of the strike plate 228 is in-line with the third slot 288 of the thermal bar 232 along line 304. "In-line" refers to the axes of the holes or other openings, such as slots, being generally aligned on the same axial line such that an elongated object, such as a bolt or a hook, can extend through both openings. It should be noted that "in-line" does not imply that the axes of the openings are in perfect alignment but only that the openings are aligned such that an elongated object can extend through the openings.

Once the strike plate 228 has been positioned in front of the thermal bar 232, the back plate 230 is placed behind the thermal bar 232 such that the portion of the sleeve 250 extending beyond the thermal bar is situated in the slot 276 of the back plate. At this position, the first circular hole 244 of the strike 228, the first elongated slot 284 of the thermal bar 232, and the first circular hole 270 of the back plate 230 are in-line along line 300 (shown in FIG. 14). The second circular hole 248 of the strike plate 228, the third elongated slot 288 of the thermal bar 332, and the third circular hole 274 of the back plate 230 are in-line along line 304 (shown in FIG. 14). Furthermore, the slot 262 of the strike plate 28 is in-line with the slot 276 of the back plate 230 to form a single slot for the hook member 220 to be inserted into.

As discussed earlier, the length L2 of the first and third slots 284,288 of the thermal bar 232 is larger than the diameter L1 of the first and third bolts 234,238 by adjustment distance X and the length L4 of the second slot 286 of the thermal bar 232 is larger than the longitudinal length L3 of the sleeve 250 by adjustment distance X. The extra lengths of first, second and third slots 284,286,288 permit the strike plate 228 to be adjustable by adjustment distance X while still allowing: 1) the first hole 244 of the strike plate 228 and the first hole 270 of the back plate 230 to be in-line with the first slot 284 of the thermal bar 232 (such that the first bolt 234 extends through first hole 244 of the strike plate and the first slot 284 of the thermal bar to engage the first hole 270 of the back plate), 2) the second hole 248 of the strike plate 228 and the second hole 274 of the back plate 230 to be in-line with the third slot 288 of the thermal bar 232 (such that the second bolt 238 extends through the second hole 248 of the strike plate and the third slot 288 of the thermal bar to engage the third hole 274 of the back plate), and 3) the slot 262 of the strike plate to be in-line with the second slot 286 of the thermal bar 232 (such that the hook member 220 in its unlocked position extends through the slot 262 of the strike plate and the second slot 286 of the thermal bar).

Figure 20:
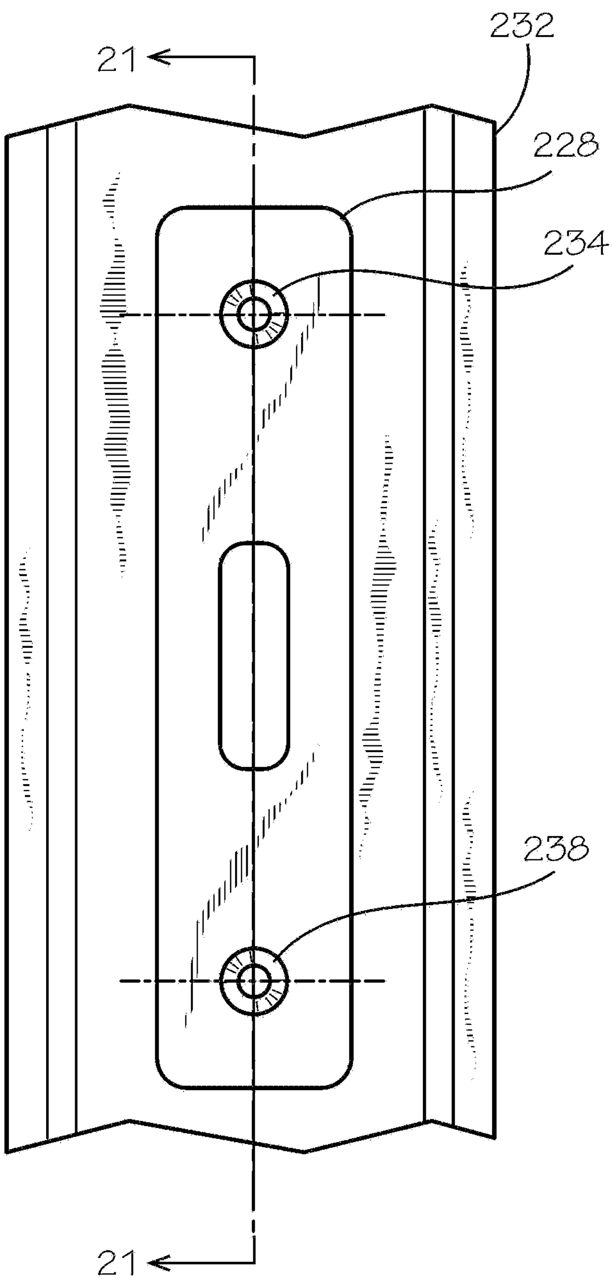
FIG. 20 is a front view of the strike assembly illustrated in FIG. 14 as assembled.
Figure 21:
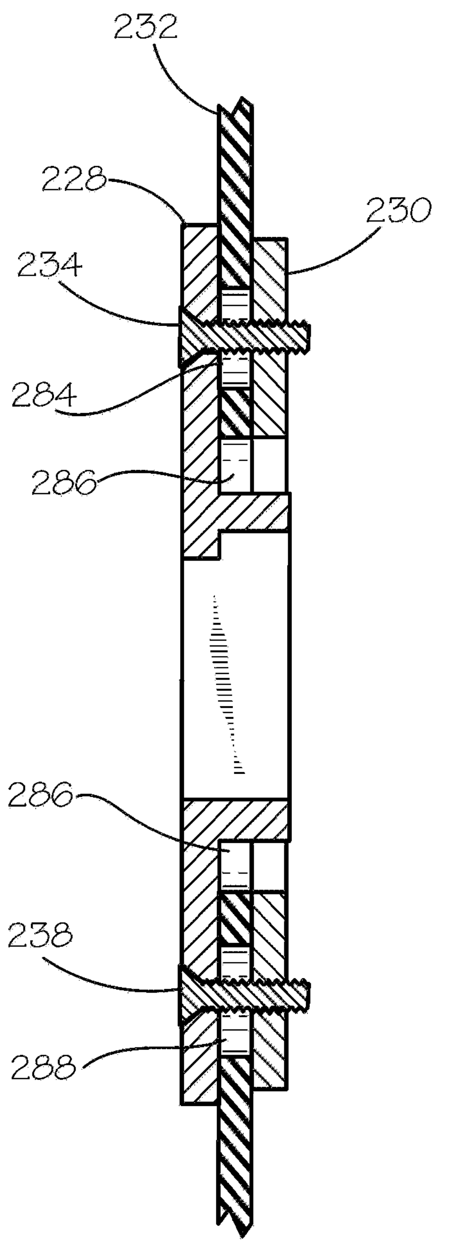
FIG. 21 is a cross-sectional view of the strike assembly along line 21-21 as shown in FIG. 20.

After the strike plate 228 is placed in front of the thermal bar 232 and the back plate 230 is placed behind the thermal bar 232 (as shown in FIGS. 20-21), the first bolt 234 is inserted through the first circular hole 244 of the strike plate and the first slot 84 of the thermal bar to engage the threading of the first circular hole 270 of the back plate (as shown in FIG. 14). The second bolt 238 is inserted through the second circular hole 248 of the strike plate and the third slot 288 of the thermal bar to engage the threading of the second circular hole 274 of the back plate. With the bolts 234,238 not fully tightened, the strike plate 228 and the back plate 230 can slide longitudinally relative to the thermal bar 232 until they are in a desired position or location, such that the hook member 220 (in the retracted unlocked position) can be inserted into the slot 262 of the strike plate 228 upon the sliding door or window 212 moved to the closed position. Once the strike plate 228 and the back plate 230 are in a desire position or location, the bolts 234,238 are fully tightened to secure the strike plate 228 and back plate 230 to the thermal bar 232. Since the first slot 284, the second slot 286, and the third slot 288 of thermal bar 232 are covered by the strike plate 228 once the strike assembly 210 is fully assembled, the excess slot openings (to permit adjustability of the strike plate relative to the thermal bar by adjustment distance X) of the first slot 284, the second slot 286 and the third slot 288 of the thermal bar will not be visible to the homeowners and hence concealed.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A strike assembly comprising:

a monolithic strike plate having a first resistivity and defining a front surface, a rear surface, and a hole, the strike plate comprising a protruding sleeve extending from the rear surface and surrounding a passage;

a back plate defining an elongated slot, the protruding sleeve extending into the elongated slot of the back plate;

a thermal bar situated between the strike plate and the back plate, the thermal bar defines a first elongated slot and a second elongated slot disposed along a length of the thermal bar, the hole of the strike plate is axially in-line with the first elongated slot of the thermal bar, the protruding sleeve of the strike plate is situated in the second elongated slot of the thermal bar, the thermal bar has a second resistivity greater than the first resistivity of the strike plate, a width of the back plate is less than a width of the thermal bar, a length of the first elongated slot is greater than a width of the first elongated slot, and a width of the strike plate is less than the width of the thermal bar;

wherein:

the protruding sleeve defines a first depth from the rear surface to a rearward-most edge of the protruding sleeve;

the passage defines a second depth from the front surface to the rearward-most edge of the protruding sleeve;

the strike plate further comprises a catch extending into the passage; and the passage defines a first passage opening at the front surface and a second passage opening at the rearward-most edge of the protruding sleeve, opposite the first passage opening.

2. The strike assembly of claim 1, wherein:

the strike plate is formed of a metallic material; and the thermal bar is formed of a polymeric material comprising a polyamide glass fiber component.

3. The strike assembly of claim 1, wherein the hole is circular.

4. The strike assembly of claim 3, wherein the strike plate defines a second circular hole and the thermal bar defines a third elongated slot, and wherein the second circular hole of the strike plate is in-line with the third elongated slot of the thermal bar.

5. The strike assembly of claim 3, wherein the back plate defines a threaded circular hole, and wherein the circular hole of the strike plate is axially in-line with the threaded circular hole of the back plate and the first elongated slot of the thermal bar.

6. The strike assembly of claim 5, wherein the strike plate defines a second circular hole, the back plate defines a second threaded circular hole and the thermal bar defines a third elongated slot, and the second circular hole of the strike plate is in-line with the second threaded circular hole of the back plate and the third elongated slot of the thermal bar.

7. The strike assembly of claim 1, wherein a front surface of the catch is flush with the front surface of the strike plate.

8. The strike assembly of claim 1, wherein the thermal bar defines a longitudinally extending channel configured to accommodate the back plate therein.

9. The strike assembly of claim 1, wherein the thermal bar further includes a first finger extending from a first edge of a front surface of the thermal bar and a second finger extending from a second edge of the front surface of the thermal bar.

10. The strike assembly of claim 9, wherein the thermal bar further includes a third finger extending from a first edge of a back surface of the thermal bar and a fourth finger extending from a second edge of the back surface of the thermal bar.

11. A strike assembly comprising:

a monolithic strike plate defining a front surface, a rear surface, and a circular hole and comprising a protruding sleeve extending from the rear surface, the protruding sleeve defining an elongated slot surrounded by the protruding sleeve;

a thermal bar defining a first elongated slot and a second elongated slot disposed along a length of the thermal bar, the circular hole of the strike plate is axially in-line with the first elongated slot of the thermal bar, the protruding sleeve of the strike plate is situated in the second elongated slot of the thermal bar, a length of the second elongated slot is longer than a length of the elongated slot of the strike plate, a length of the first elongated slot is greater than a width of the first elongated slot, and a width of the strike plate is less than a width of the thermal bar;

wherein:

the protruding sleeve defines a first depth from the rear surface to a rearward-most edge of the protruding sleeve;

the elongated slot of the strike plate defines a second depth from the front surface to the rearward-most edge of the protruding sleeve;

the strike plate further comprises a catch extending into the elongated slot of the strike plate; and the elongated slot of the strike plate defines a first slot opening at the front surface and a second slot opening at the rearward-most edge of the protruding sleeve, opposite the first slot opening.

12. The strike assembly of claim 11, wherein the strike assembly further comprises a bolt located in the circular hole of the strike plate and the first elongated slot of the thermal bar.

13. The strike assembly of claim 12, further comprising a back plate wherein the bolt threadingly engages the back plate to secure the strike plate to the thermal bar.

14. The strike assembly of claim 11, wherein the thermal bar has a resistivity greater than resistivity of the strike plate.

15. The strike assembly of claim 14, wherein the thermal bar is formed of a polymeric material.

16. The strike assembly of claim 11, wherein the strike plate further comprises a second protruding sleeve extending from the strike plate, and wherein the second protruding sleeve is situated in the second elongated slot of the thermal bar.

17. A method for providing an adjustable strike, the method comprising:

providing a monolithic strike plate defining a front surface, a rear surface, and a circular hole and comprising a protruding sleeve extending from the rear surface, the protruding sleeve defining an elongated slot surrounded by the protruding sleeve, wherein:

the protruding sleeve defines a first depth from the rear surface to a rearward-most edge of the protruding sleeve;

the elongated slot of the strike plate defines a second depth from the front surface to the rearward-most edge of the protruding sleeve;

the strike plate further comprises a catch extending into the elongated slot of the strike plate; and the elongated slot of the strike plate defines a first slot opening at the front surface and a second slot opening at the rearward-most edge of the protruding sleeve, opposite the first slot opening;

providing a thermal bar defining a first elongated slot and a second elongated slot disposed along a length of the thermal bar, a length of the first elongated slot is greater than a width of the first elongated slot, and a width of the strike plate is less than a width of the thermal bar;

inserting the protruding sleeve of the strike plate into the second elongated slot of the thermal bar;

sliding the strike plate longitudinally relative to the thermal bar until the elongated slot of the strike plate is in a desired location, wherein a length of the second elongated slot is longer than a length of the elongated slot of the strike plate;

aligning the circular hole of the strike plate with the first elongated slot of the thermal bar;

providing a fastener and inserting the fastener in the circular hole of the strike plate and the first elongated slot of the thermal bar; and providing a back plate and threadingly abutting the fastener to the back plate to secure the strike plate to the thermal bar.

18. The method according to claim 17, wherein the thermal bar has a resistivity greater than resistivity of the strike plate.

19. The method according to claim 18, wherein the back plate is formed of a polymeric material.

20. The method according to claim 17, wherein the strike plate further comprises a second protruding sleeve extending from the strike plate, the method further comprising inserting the second protruding sleeve of the strike plate into the second elongated slot of the thermal bar.

21. The method according to claim 17, wherein the catch extends into the elongated slot of the strike plate so as to engage a hook member to stop one of a sliding door or a sliding window from being moved away from the strike plate toward an open position.

* * * * *